US 6,607,705 B2

(12) United States Patent
Pinnavaia et al.

(10) Patent No.: US 6,607,705 B2
(45) Date of Patent: Aug. 19, 2003

(54) PROCESS FOR THE PREPARATION OF MOLECULAR SIEVE SILICAS

(75) Inventors: Thomas J. Pinnavaia, East Lansing, MI (US); Thomas R. Pauly, Lansing, MI (US); Seong-Su Kim, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 301 days.

(21) Appl. No.: 09/834,319

(22) Filed: Apr. 13, 2001

(65) Prior Publication Data
US 2001/0043901 A1 Nov. 22, 2001

Related U.S. Application Data
(60) Provisional application No. 60/197,033, filed on Apr. 13, 2000.

(51) Int. Cl.[7] .................... C01B 33/18; C01B 33/26
(52) U.S. Cl. .................. 423/328.2; 423/329.1; 423/335
(58) Field of Search ............ 423/328.1, 328.2, 423/329.1, 335

(56) References Cited

U.S. PATENT DOCUMENTS

| 5,622,684 A | * | 4/1997 | Pinnavaia et al. | 423/702 |
|---|---|---|---|---|
| 5,795,559 A | * | 8/1998 | Pinnavaia et al. | 423/702 |
| 5,800,799 A | * | 9/1998 | Pinnavaia et al. | 423/702 |
| 5,840,271 A | * | 11/1998 | Carrazza et al. | 423/700 |
| 6,106,802 A | * | 8/2000 | Lujano et al. | 423/702 |
| 6,190,639 B1 | * | 2/2001 | Guth et al. | 423/702 |
| 2003/0031615 A1 | * | 2/2003 | Satou et al. | 423/335 |

FOREIGN PATENT DOCUMENTS

EP  WO-200010916 A  *  3/2000

OTHER PUBLICATIONS

Zhou, et al., "Nonionic Triblock and Star Diblock Copolymer and Oligomeric Surfactant Synthesis of Highly Ordered, Hydrothermally Stable, Mesoporous Silica Structures," J. Am. Chem. Soc., 120, pp. 6024–6036, 1998.*

* cited by examiner

Primary Examiner—David Sample
(74) Attorney, Agent, or Firm—Ian C. McLeod

(57) ABSTRACT

A process for the preparation of mesostructured molecular sieve silicas from inorganic silicon precursors and polyoxyethylene oxide based polymers is described. The silicas are stable upon calcination to 600° to 800° C. The silicas are useful in refining processes.

28 Claims, 11 Drawing Sheets

PROCESS FOR THE PREPARATION OF MOLECULAR SIEVE SILICAS

CROSS-REFERENCE TO RELATED APPLICATIONS

The present application relies for priority on application Ser. No. 60/197,033, filed Apr. 13, 2000.

STATEMENT REGARDING FEDERALLY SPONSORED RESEARCH OR DEVELOPMENT

This invention was sponsored by NSF grants CHE 96-33798 and 99-03706. The government has certain rights in this invention.

BACKGROUND OF THE INVENTION

1. Field of the Invention

The present invention relates to a process for the preparation of molecular sieve silicas, particularly calcined silicas. In particular the present invention relates to the use of water soluble silicates and non-ionic polyoxyethylene oxide PEO based surfactants for the preparation of the silicas which have thermal stability.

2. Description of Related Art

Mesoporous silicas are useful in a variety of applications. Calcined silicas are useful in refining if they are stable at temperatures between 600° C. to 800° C.

Mesoporous molecular sieve silicas with wormhole framework structures (e.g., MSU-X (Bagshaw, S. A., et al., *Science* 269 1242 (1995); Bagshaw, S. A., et al., *Angwen. Chem., Int. Ed. Engl.,* 35 1102 (1996); and Prouzet, E., et al., *Angwen. Chem., Int. Ed. Engl.,* 36 516 (1997)), and HMS (Tanev, P. T., et al., *Science* 267 865 (1995)) are generally more active heterogeneous catalysts in comparison to their ordered hexagonal analogs (e.g., MCM-41 (Beck, J. S., et al., *J. Am. Chem. Soc.,* 114 10834 (1992)), SBA-3 (Huo, Q., et al., *Nature* 368 317 (1994)), and SBA-15 (Zhao, D., et al., *J. Am. Chem. Soc.,* 120 6024 (1998)). The enhanced reactivity has been attributed, in part, to a pore network that is connected in three dimensions, allowing the guest molecules to more readily access reactive centers that have been designed into the framework surfaces (Zhang, W., et al., *Stud. Surf. Sci. Catal.,* 117 23 (1998); Reddy, J. S., et al., *J. Chem. Soc., Chem. Commun.,* 1059 (1994); Reddy, J. S., et al., *J. Chem. Soc., Chem. Commun.* 2231 (1995); Sayari, A., *Chem. Mater.* 8 1840 (1996); Mokaya, R., et al., *J. Catal.,* 172 211 (1997); and Kloetstra, K. R., et al., *J. Chem. Soc., Chem. Commun.,* 228 (1997)). All of the wormhole framework structures reported to date have been prepared through supramolecular S°I° (Tanev, P. T., et al., *Science* 267 865 (1995)) and N°I° (Bagshaw, S. a., et al., *Science* 269 1242 (1995); Bagshaw, S. A., et al., *Angwen. Chem. Int. Ed. Engl.,* 35 1102 (1996); and Prouzet, E., et al., Angwen. Chem. Int. Ed. Engl., 36 516 (1997)) assembly pathways where I° is an electrically neutral silica precursor (typically, tetraethylorthosilicate, TEOS), S° is a neutral amine surfactant, and N° is a neutral di- or tri-block surfactant containing polar polyethylene oxide (PEO) segments. One disadvantage of these pathways, as with other assembly pathways based on TEOS, is the high cost of the hydrolyzable silicon alkoxide precursor. Greater use of wormhole framework structures as heterogeneous catalysts may be anticipated if a more efficient approach to either S°I° or N°I° assembly could be devised based on the use of low cost soluble silicate precursors, without sacrificing the intrinsically desirable processing advantages of these pathways (e.g., facile removal and recycling of the surfactant). Related patents are: U.S. Pat. Nos. 5,622,684, 5,795,559, 5,800,799 and 6,027,706 to Pinnavaia et al.

Recently, Guth and co-workers reported the preparation of disordered silica mesostructures by precipitation from sodium silicate solutions over a broad range of pH in the presence of Triton-X 100, a N° surfactant (Sierra, L., et al., *Adv. Mater.,* 11(4) 307 (1999)). The retention of a mesostructure was observed up to a calcination temperature of 480° C., but the complete removal of the surfactant at 600° C. led either to the extensive restructuring of the silica framework, as indicated by the loss of mesoporosity or the formation of a completely amorphous material.

There is a need for mesostructures structurally stable to calcination temperatures in excess of 600° to 800° C.

SUMMARY OF THE INVENTION

Figure 1:
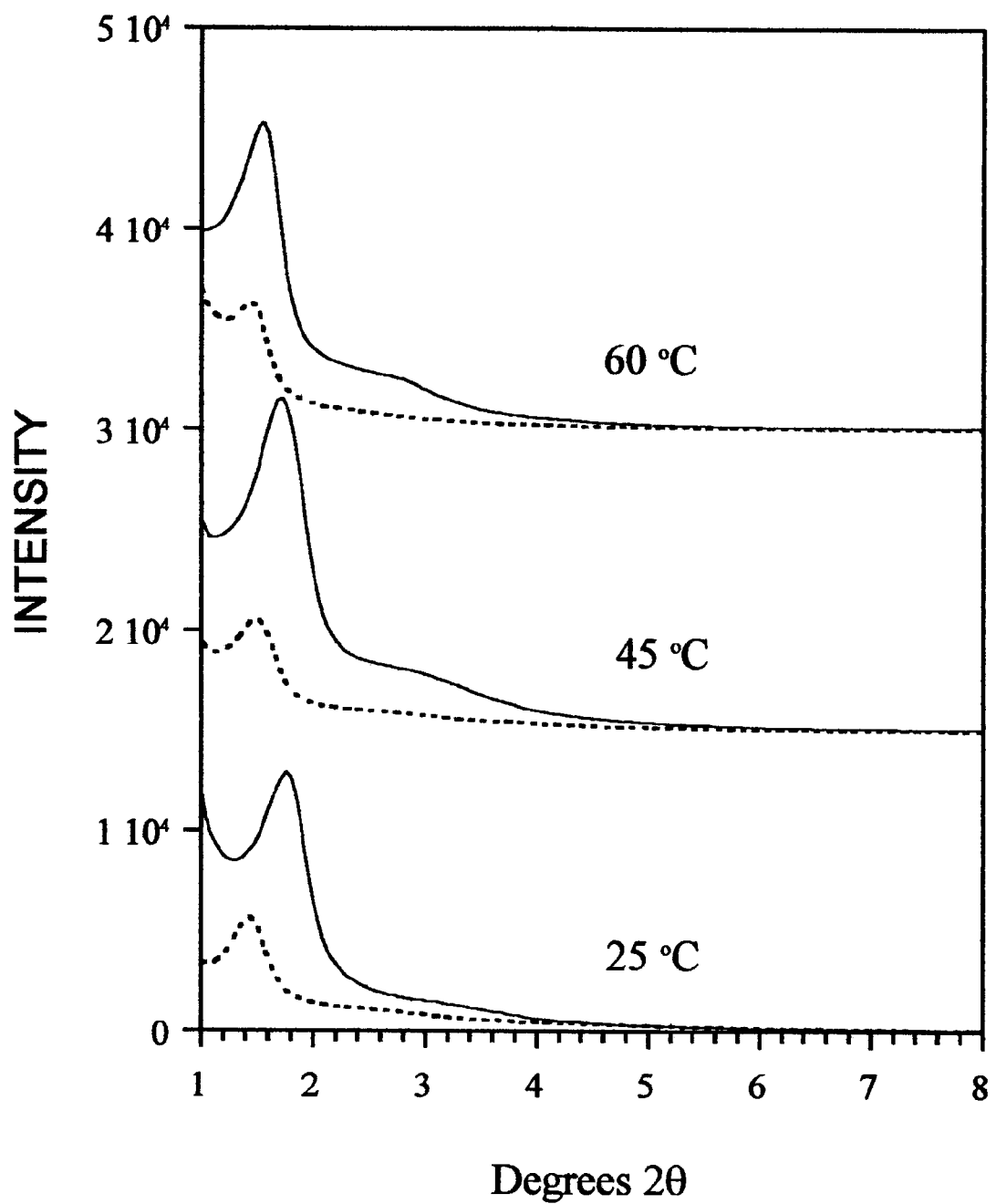
FIG. 1 is a graph showing XRD patterns of MSU-X' silica molecular sieves of the present invention formed from sodium silicate and Brij 56 under neutral pH conditions at 25°, 45°, and 60° C., respectively. Dashed and solid curves are for the as-synthesized and calcined products, respectively. The numbers adjacent to each diffraction peak are the pore-pore correlation distances in angstrom (Å) units.

The present invention relates to a process for the preparation of a molecular sieve silica which comprises:

(a) providing an aqueous solution of a water soluble silicate at a pH>9;

(b) combining the aqueous solution with a non-ionic polyoxyethylene oxide based surfactant and an acid in aqueous solution to produce a resulting mixture wherein the acid causes the pH of the mixture to be between about 4 and 10;

(c) aging the resulting mixture at a temperature between 0 and 150° C. until the molecular sieve silica is formed; and (d) removing at least the aqueous solution to produce the molecular sieve silica.

The present invention also relates to a process for the preparation of a molecular sieve aluminosilicate which comprises:

(a) providing an aqueous solution of a water soluble aluminate and silicate in a molar ratio of aluminate to silicate of between about 0.01 and 1.0 at a pH>9;

(b) combining the aqueous solution with a non-ionic polyoxyethylene oxide based surfactant and an acid in aqueous solution to produce a resulting mixture wherein the acid causes the pH of the mixture to be between about 4 and 10;

(c) aging the resulting mixture at a temperature between 0 and 150° C. until the molecular sieve aluminosilicate is formed; and (d) removing at least the aqueous solution to produce the molecular sieve aluminosilicate.

Further, the present invention relates to a process for the preparation of a molecular sieve aluminosilicate which comprises:

(a) providing an aqueous solution of a water soluble silicate at a pH>9;

(b) combining the aqueous solution with a non-ionic polyoxyethylene oxide surfactant, an aluminum salt and an acid in aqueous solution to produce a resulting mixture wherein the aluminum to silicon molar ratio is between 0.01 and 1.0 and the acid and the aluminum salt causes the pH of the mixture to be between about 4 and 10;

(c) aging the resulting mixture at a temperature between 0 and 150° C. until the molecular sieve silica is formed; and (d) removing at least the aqueous solution to produce the molecular sieve aluminosilicate.

The present invention also relates to a process for the preparation of a mesostructured silicate which comprises:

(a) acidifying a solution of a non-ionic polyethylene oxide based surfactant as an organic structure director with an acid selected from the group consisting of an organic acid, a mineral acid and an oxy acid;

(b) preparation of a reactive silica species by neutralization of a soluble silicate solution through addition to the acidified surfactant reaching a final pH of 4 to 10;

(c) aging the reactive organic-inorganic species for no less than 5 minutes at temperatures between 0 and 150° C. and optionally adding a precursor for the incorporation of an element in addition to silicon into the silicate framework, and continuing the aging process to complete the crosslinking of the framework;

(d) recovering of the silicate by filtration or other suitable solvent removal procedure; and (e) optionally removing the surfactant from the silicate by solvent extraction or by calcination at least 400° C. in air for not less than 30 minutes or by a combination of solvent extraction and calcination, wherein the resulting silicate possesses uniform framework-confined mesopores with pore diameters ranging from 1.5 to 30.0 nm; the composition exhibits at least one resolved powder X-ray reflection corresponding to a pore-pore correlation spacing of 2.0–35.0 nm, silicate wall thickness of greater than 0.5 nm, specific surface areas of 300–1400 $m^2/g$, framework pore volumes of 0.2–3.0 cc/g $N_2$, and textural pore volumes of 0.0–2.0 cc/g $N_2$.

The present invention also relates to a process for the preparation of a mesostructured silicate composition which comprises the steps of:

(a) preparing a solution of a water soluble silicate at a pH greater than about 9.0;

(b) preparing a solution of a polyoxyethylene oxide based surfactant and acid at a pH less than 4;

(c) combining solutions of steps (a) and (b) to form a reactive mixture at a pH between 4 and 10 and at a temperatures between 0 and 150° C.;

(d) aging the mixture at temperatures between 0 and 150° C. for a period of at least 5 minutes to form a silicate-surfactant mesostructure;

(e) washing the silicate-surfactant mesostructure with water;

(f) recovering the washed mesostructure by filtration, centrifugation, or a combination of filtration and centrifugation;

(g) drying the recovered mesostructure at or above ambient temperature; and (h) removing the surfactant from the dried mesostructure by solvent extraction, by calcination at a temperature above about 400° C. or by a combination of solvent extraction and calcination.

The present invention also relates to a process for the preparation of a mesostructured aluminosilicate which comprises:

(a) acidifying a solution of a non-ionic polyethylene oxide based surfactant as the organic structure director with an acid selected from the group consisting of an organic acid, a mineral acid and an oxy acid;

(b) preparation of a reactive silicor and aluminum species by neutralization of a soluble silicate and aluminate solution through addition to the acidified surfactant reaching a final pH of 4 to 10;

(c) aging the solution of step (b) for no less than 5 minutes at temperatures between 0 and 150° C. to produce an aluminosilicate;

(d) recovering the aluminosilicate by filtration or other suitable solvent removal procedure; and (e) removing the surfactant from the aluminosilicate by solvent extraction or by calcination at least 4000° C. in air for not less than 30 minutes or by a combination of solvent extraction and calcination, wherein the aluminosilicate possesses uniform framework-confined mesopores with pore diameters ranging from 1.5 to 30.0 nm; the composition exhibits at least one resolved powder X-ray reflection corresponding to a pore-pore correlation spacing of 2.0–35.0 nm, inorganic oxide wall thickness of greater than 0.5 nm, specific surface areas of 300–1400m²/g, framework pore volumes of 0.2–3.0 cc/g $N_2$, and textural pore volumes of 0.0–2.0 cc/g $N_2$.

The present invention particularly relates to a process wherein the silicate has a composition expressed in anhydrous form as follows:

$$M_{n/q}(B_p Si_{1-p} O_h)$$

wherein M is one or more ions; n is the charge of the composition excluding M expressed as oxides; q is the molar average valence of M; n/q is the number of moles or mole fraction of M where n/q=0 to 0.5; h is a number of from 2 to 2.50, B is one or more atoms selected from the group consisting of Ar, B, Ge, Sb, Zr, V, W, P, Ba, Y, La, Ce, Sn, Ti, Cr, Nb, Fe, V, Ga, Al, Zn, Zr, Co, Ni, Mo and Cu, and p=0.0 to 0.5.

The present invention also relates to a process wherein the silicate has a composition expressed as follows:

$$r(EO)M_{n/q}(B_p Si_{1-p} O_h)$$

wherein EO is the total organic material not included in M; EO is selected from the group of non-ionic alkyl polyethylene oxide, alkyl and aryl polyethylene oxide and polyethylene oxide-polypropylene oxide-polyethylene oxide block co-polymer molecules; and r is the moles of EO.

DESCRIPTION OF PREFERRED EMBODIMENTS

The present invention provides a novel process for the synthesis of mesostructured silicas and substituted silicas. This process uses a cooperative mechanism of assembly between inorganic silica sources (i.e. sodium silicate "water glass", and the like) and non-ionic polyethylene oxide (PEO) based surfactants under neutral, or near neutral pH conditions (hydrogen bonding assembly pathway). This process differs from prior art in the ability to utilize inexpensive reagents for both the organic structure directors and the inorganic silica source to produce very stable calcined products.

In particular the synthesis:
1. Utilizes a variety of silica sources in particular:
   a. Sodium Silicate (water glass)
   b. Colloidal Silica; and
   c. Fumed Silica.
2. Utilizes PEO based surfactants.
3. Utilizes a variety of bases in preparation of basic silica solutions (alkali, alkaline, organic).
4. Utilizes variety of acid sources (organic and mineral) to neutralizing basic silicate solutions.
5. Controls pH to direct mesophase formation of final silicate structure.
6. Uses temperature variations to effect pore characteristics along with framework structure. In particular:
   a. Increases temperature to increase pore size; and
   b. Increases temperature to increase framework cross-linking and dehydroxylation of the pore surface.
7. Controls particle size and morphology by adjustment to synthesis conditions.

In particular, the composition provides:
1. A variable alkali (alkaline) ion content in the final product.
2. A variable PEO surfactant (N°) to $SiO_2$ (I°) ratio (0.05–0.50).
3. Uniform pore size and spacing which leads to x-ray scattering characteristics.
4. Pore diameters from 1.5–30 nm from the PEO templated solutions.
5. Long range pore order obtained with regulated surfactant in PEO based synthesis.
6. Trivalent hetero-atom substitution in the mesostructured silica (Al, B, Ga, Fe).
7. Tetravalent hetero-atom substitution in the mesostructured silica (Ge, Ti, V, Sb, Zr, Sn).
8. Penta- or Hexavalent hetero-atom substitution in the mesostructured silica (V, W, Mo).

| The silica sources are: | |
|---|---|
| Aldrich | Sodium Silicate, 27% $SiO_2$, 14% NaOH from Aldrich (Milwaukee, WI). |
| Ludox | Colloidal, Ludox HS-40, 39.5% $SiO_2$, 0.5% NaOH from Dupont via Aldrich |
| Fumed | Fumed Silica, 99.5% $SiO_2$ from Aldrich |
| P.Q. Corp (Valley Forge, PA) silicas: | |
| D | Sodium Silicate, 29% $SiO_2$, 19% NaOH. |
| RU | Sodium Silicate, 34% $SiO_2$, 18% NaOH. |
| K | Sodium Silicate, 32% $SiO_2$, 14% NaOH. |
| N | Sodium Silicate, 28% $SiO_2$, 12% NaOH. |
| The Acids are: | |
| Ace-H⁺ | Acetic Acid, $CH_3CO_2H$. |
| HX | X = Cl, Br, I |
| $H_n y$ | $H_2SO_4$, $HNO_3$, $H_2CO_3$, $H_3PO_4$, where n is the charge on y. |
| HZ | Organic Acid, Formic, Glycolic, etc. |

Wide-angle powder x-ray diffraction (XRD) patterns were obtained for all samples using a Rigaku Rotaflex Diffractometer (The Woodlands, Tex.) with Cu Kα radiation (λ=0.154 nm). Counts were accumulated every 0.02 degrees (2θ) at a scan speed of 1 degree (2θ/min. X-ray scattering provides structural data on the spatial arrangement of mesoporous channels within the porous oxide on one length sale, and the atomic ordering of the oxide itself on a smaller length scale. Periodically ordered channels within an oxide and/or the crystalline oxide itself, will provide Bragg scattering indicative of the corresponding symmetry. X-ray scattering from disordered channel structures, however, results in correlation peaks whose scattering intensity versus angle is dependent on the average pore to pore distance and uniformity of this separation within the oxide. Differences in the positions of correlation peak for disordered pore systems indicate changes in the average poren-pore separation.

$N_2$ adsorption-desorption isotherms were obtained at −196° C. on a Micromeritics ASAP 2010 Sorptometer (Norcross, Pa.) using static adsorption procedures in order to characterize the pore structure. Samples were out gassed at 150° C. and $10^{-6}$ Torr for a minimum of 12 hours prior to analysis. BET surface areas were calculated from the linear part of the BET plot according to IUPAC (Sing, K. S. W., et al., Pure Appl. Chem. 57 603 (1985)) recommendations. Most previously reported studies of mesoporous molecular sieves have made use of the Horvath-Kawazoe (HK) model (Horvath, G., et al., J. Chem. Eng. Jpn. 16, 470 (1983)) for the determination of pore size distributions from $N_2$ adsorption isotherms. This model, developed for microporous lamellar carbons, assumes slit-like micropores. Therefore, its applicability to materials with larger, cylindrical mesopores is likely to be severely limited, particularly at pore sizes above 5.0 nm. Therefore the Barrett-Joyner-Halender (BJH) (Barrett, E. P., et al., J. Amer. Chem. Soc. 73, 373

(1951)) model was applied to the adsorption and desorption legs of the nitrogen isotherms to determine the pore size distribution for materials with pore diameters in excess of 5.0 nm. The framework pore volume ($V_f$) for each mesostructured sample is taken as the volume adsorbed at the completion of capillary condensation within the framework pores (mid-P/Po $N_2$ uptake), whereas the total pore volume ($V_t$) is the volume adsorbed at 0.99 P/Po. Textural pore volume ($V_{tx}$) is the difference ($V_t$-$V_f$). Pore wall thickness for disordered pore oxides is determined by subtracting the Barrett-Joyner-Halender (BJH) pore size from the pore-pore correlation distance determined from x-ray scattering. Pore wall thickness for periodically ordered pore oxides is determined by subtracting the Barrett-Joyner-Halender (BJH) pore size from the unit cell parameter, $a_o$, determined from x-ray scattering.

TEM images were obtained on a JEOL JEM-100CX II (Peabody, Mass.) electron microscope with a $CeB_6$ filament, an accelerating voltage of 120 KV, a beam size of approx. 5 $\mu$m and objective lens aperture of 20 $\mu$m. Samples were prepared by sonicating the powdered sample for 20 minutes in EtOH, and then evaporating 2 drops onto carbon coated copper grids. The electron diffraction patterns were recorded by using an acceleration voltage of 120 kV, a beam size of approx. 5 $\mu$m, and a diffraction aperture of 20 $\mu$m.

The Thermogravimetric analyses (TGA) of all samples were performed on a CAHN system TG analyzer using heating rate of 5° C./min.

$^{29}Si$ MAS NMR spectrum were recorded on a Varian 400 VRX (Palo Alto, Calif.) solid-state NMR Spectrometer at 79.5 MHz under single-pulse mode with a 7-mm Zirconia rotor, a spinning frequency of 4 kHz, pulse width of 8.5 $\mu$s and a pulse delay of 800 seconds. The chemical shifts were referenced to TMS (tetramethylsilane).

EXAMPLE 1 TO 3

The process of the present invention produces thermally stable wormhole structures. In the synthesis, the surfactant and an amount of acid equivalent to the hydroxide content of the sodium silicate solution (e.g., 27% $SiO_2$, 14% NaOH, Aldrich) are first mixed at ambient temperature and then added to the sodium silicate solution to form reactive silica in the presence of the surfactant. This allows the assembly of the framework structure at near-neutral pH and avoids the need for readjusting the pH once the reactive silica has been formed. The assembly process is carried out at a molar ratio $SiO_2$/surfactant in the range 13 to 7.0 to 1 and at a temperature in the range 25° and 60° C. for a period of 10 to 20 hrs. The surfactant is then removed from the washed and air-dried products either by solvent extraction with hot ethanol or by calcination in air at 600° C.

FIG. 1 illustrates the powder x-ray diffraction patterns of as-synthesized and calcined MSU-X' silicas prepared at three different temperatures using Brij 56 ($C_{16}H_{33}(EO)_{10}H$) as the structure-directing surfactant. Each product exhibits an intense reflection at low 2θ corresponding to a pore-pore correlation distance of ~63 Å with a broad shoulder in the range of 2°–3°2θ. These patterns are typical of disordered wormhole-like pore structures and are similar to those of MSU-X silicas assembled from the same surfactant, but with TEOS as the silica precursor. After calcination at 600° C., the intensities of the pore-pore correlation peaks are substantially greater than the as-synthesized samples due to the removal of the contrast-matching surfactant. This result is consistent with the retention of the framework pore structure upon complete removal of the surfactant from the framework.

Figure 2:
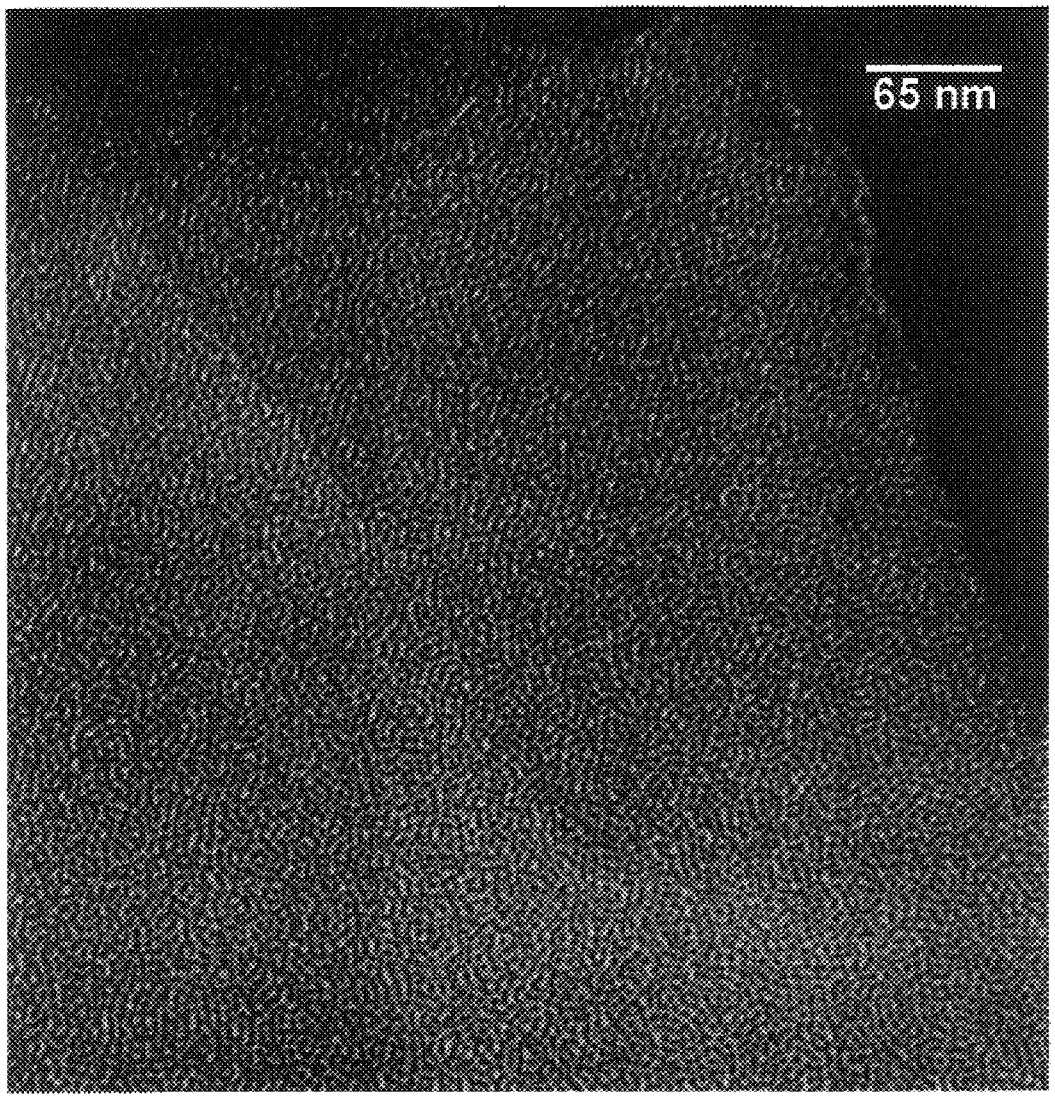
FIG. 2 is a TEM image of wormhole pore structure of the calcined MSU-X' sample of the present invention prepared from sodium silicate and Brij 56 under neutral pH conditions at 60° C.
Figure 3:
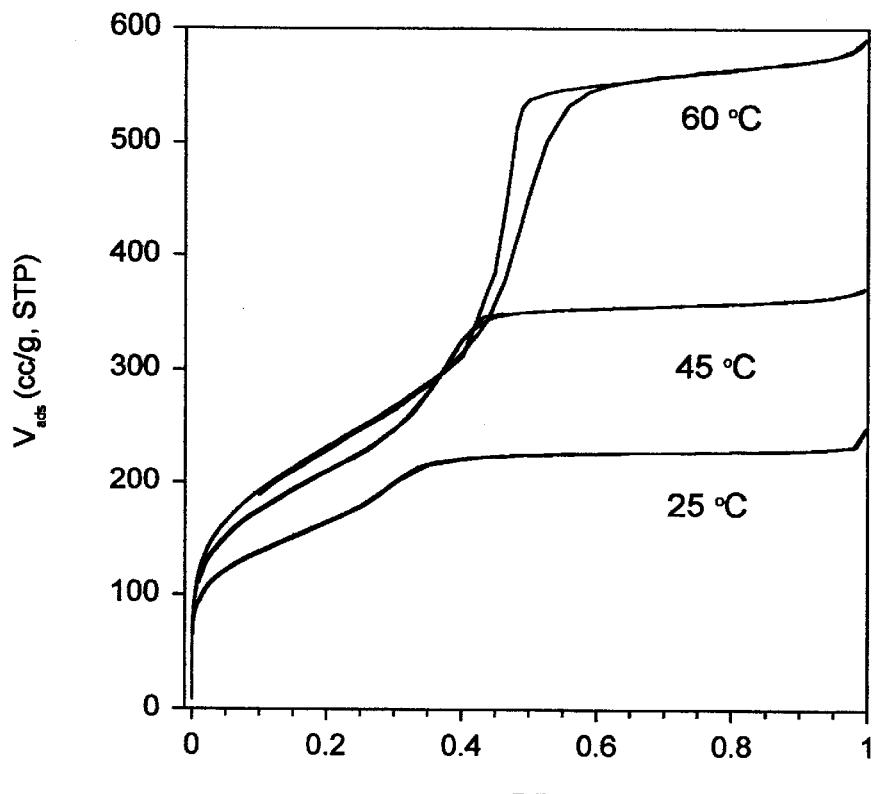
FIG. 3 is a graph showing $N_2$ adsorption-desorption isotherms for the calcined MSU-X' silica molecular sieves of the present invention formed from sodium silicate and Brij 56 under neutral pH conditions at 25°, 45°, and 60° C., respectively.
Figure 3A:
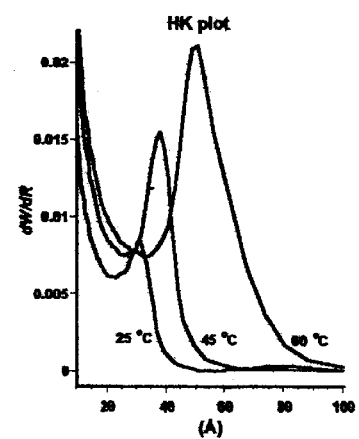
FIG. 3A is a graph showing the Horvath-Kawazoe pore size distributions.

Further evidence for the wormhole framework pore structure of MSU-X' silicas is provided by the typical transmission electron micrograph (TEM) image shown in FIG. 2. This micrograph clearly exhibits disordered wormhole-like pores similar to MSU-X materials. FIG. 3 illustrates the $N_2$ adsorption-desorption isotherms and Horvath-Kawazoe pore size distributions (FIG. 3A) for the calcined MSU-X' products assembled at 25°, 45° and 60° C. The sample assembled at 25° exhibits the smallest pore size (32 Å) in the series, and the largest HK pore diameter (50 Å) is observed from the 60° C. sample. The increase in framework pore size with increasing assembly temperature is a characteristic feature of an N°I° assembly pathway (Prouzet, E., et al., Angwen. Chem., Int. Ed. Engl. 36 (1997)). The description hysteresis observed for the product prepared at 60° C. is indicative of the necking of the interconnected wormhole pore structure. In addition, the pore wall thickness, as obtained from the difference between the pore-pore correlation distance and the HK pore size, decreases with increasing assembly temperature (Table 1).

TABLE 1

Physicochemical properties of mesoporous silica (MSU-X) prepared using sodium silicate and non-ionic surfactants.

| Surfactant | Synthesis Temperature (° C.) | Pore-Pore Distance (Å) as-syn. | Pore-Pore Distance (Å) Calcined[a] | BET Surface area ($m^2g^{-1}$) | Pore Size (Å) | Wall Thickness[b] (Å) | Pore Volume ($cm^3g^{-1}$) |
|---|---|---|---|---|---|---|---|
| Brij 56 | RT | 63.1 | 50.6 | 602 | 32 | 25 | 0.36 |
| Brij 56 | 45 | 61.3 | 52.6 | 769 | 37 | 16 | 0.57 |
| Brij 56 | 60 | 63.1 | 58.1 | 849 | 50 | 8 | 0.90 |
| Brij 35 | 60 | 59.7 | 52.5 | 853 | 33 | 20 | 0.65 |
| Brij 58 | 60 | 66.9 | 58.1 | 821 | 43 | 15 | 0.80 |
| Brij 78 | 60 | 69.0 | 61.4 | 851 | 48 | 13 | 0.83 |
| Tergital (15-S-15) | 60 | 59.7 | 53.2 | 979 | 40 | 13 | 0.86 |
| Tween 20 | 60 | 58.9 | 52.9 | 883 | 42 | 11 | 0.84 |

TABLE 1-continued

Physicochemical properties of mesoporous silica (MSU-X) prepared using sodium silicate and non-ionic surfactants.

| Surfactant | Synthesis Temperature (° C.) | Pore-Pore Distance (Å) as-syn. | Pore-Pore Distance (Å) Calcined[a] | BET Surface area ($m^2g^{-1}$) | Pore Size (Å) | Wall Thickness[b] (Å) | Pore Volume ($cm^3g^{-1}$) |
|---|---|---|---|---|---|---|---|
| Tween 40 | 60 | 65.9 | 58.9 | 753 | 49 | 10 | 0.80 |
| Tween 60 | 60 | 66.9 | 58.9 | 773 | 48 | 11 | 0.75 |
| Tween 80 | 60 | 71.2 | 65.0 | 867 | 51 | 14 | 0.89 |

[a]Calcined at 600° C. for 4 h in air.
[b]The wall thickness was calculated by subtracting the HK pore diameter from the correlation distance.

This latter behavior, which is related to the increase in the hydrophobic character of the PEO block as the surfactant approaches the cloud point, also is a characteristic feature of N°I° assembly (Prouzet, E., et al., *Angwen. Chem., Int. Ed. Engl.* 36 (1997)). Because Na⁺ ions are present in the assembly process, there may also be an electrostatic contribution to framework formation through complexation of Na⁺ by the N° surfactant. However, electrostatically controlled [N°M⁺]I° assembly processes tend to form ordered hexagonal or cubic framework structures, not wormhole frameworks (Zhang, W. Z., et al., *Chem. Commun.*, 1803 (1999)).

EXAMPLES 4 TO 15

Wormhole silica molecular sieves can also be assembled from water-soluble silicate precursors using N° surfactants other than Brij 56. Table 1 summarizes the textural properties of wormhole silica assembled from sodium silicate and other Brij surfactants, a Tergitol [$C_{11-15}H_{23-31}$ $(EO)_{15}H$] surfactant, and several alky-PEO/furan Tween X surfactants (X=20, 40, 60 and 80). Table 1 also shows that each of these surfactants form mesostructures with 33 to 51 Å pore sizes and surface areas and pore volumes comparable to MSU-X silicas prepared from TEOS. TEM analysis of each product confirmed the wormhole pore structure.

The successful assembly of thermally stable mesoporous silica molecular sieve silicas with wormhole frameworks from soluble silicate precursors demonstrates that one skilled in the art can substitute soluble silicate precursors for the assembly of many other silica mesostructures that heretofore have been assembled exclusively from silicon alkoxide precursors. Also other members of the MSU family of mesostructures, as well as SBA mesostructures can be obtained through an electrostatic N°(H⁺X⁻)I⁺ assembly pathway (Zhao, D., et al., *J. Am. Chem. Soc.*, 120 6024 (1998)).

EXAMPLES 16 TO 19

A 1.2 grams of Brij X (X=35, 56, 58, and 78) is dissolved in a solution prepared with 10 milliliters of deionized $H_2O$ and 10 milliliters of 1M $CH_3COOH$ under stirring for 20 h. An amount of sodium silicate solution, which contains 2.7 grams of silica (27% $SiO_2$, 14% NaOH, Aldrich) is diluted with 30 milliliters of deionized $H_2O$ and added under stirring to the acidic surfactant solution. The reaction vessel was sealed and stirred for 20 h at 60° C. The resulting solid product is recovered by filtration and calcined at 600° C. for 4 hours in air to remove the incorporated template. The amounts of each surfactant used in the Examples 16–19, together with the corresponding physicochemical parameters are summarized in Table 2.

TABLE 2

| Example | Template formula | $d_{100}$(Å) as-syn. | $d_{100}$(Å) cal. | HK pore size (Å) | BET Surface area ($m^2/g$) | Wall thickness (Å) | Pore Volume ($cm^3g^{-1}$) |
|---|---|---|---|---|---|---|---|
| 16 | Brij 35 | 59.7 | 52.5 | 33 | 853 | 20 | 0.65 |
| 17 | Brij 56 | 63.1 | 58.1 | 50 | 849 | 8 | 0.90 |
| 18 | Brij 58 | 66.9 | 58.0 | 43 | 821 | 15 | 0.80 |
| 19 | Brij 78 | 69.0 | 61.4 | 48 | 851 | 13 | 0.83 |

Figure 4:
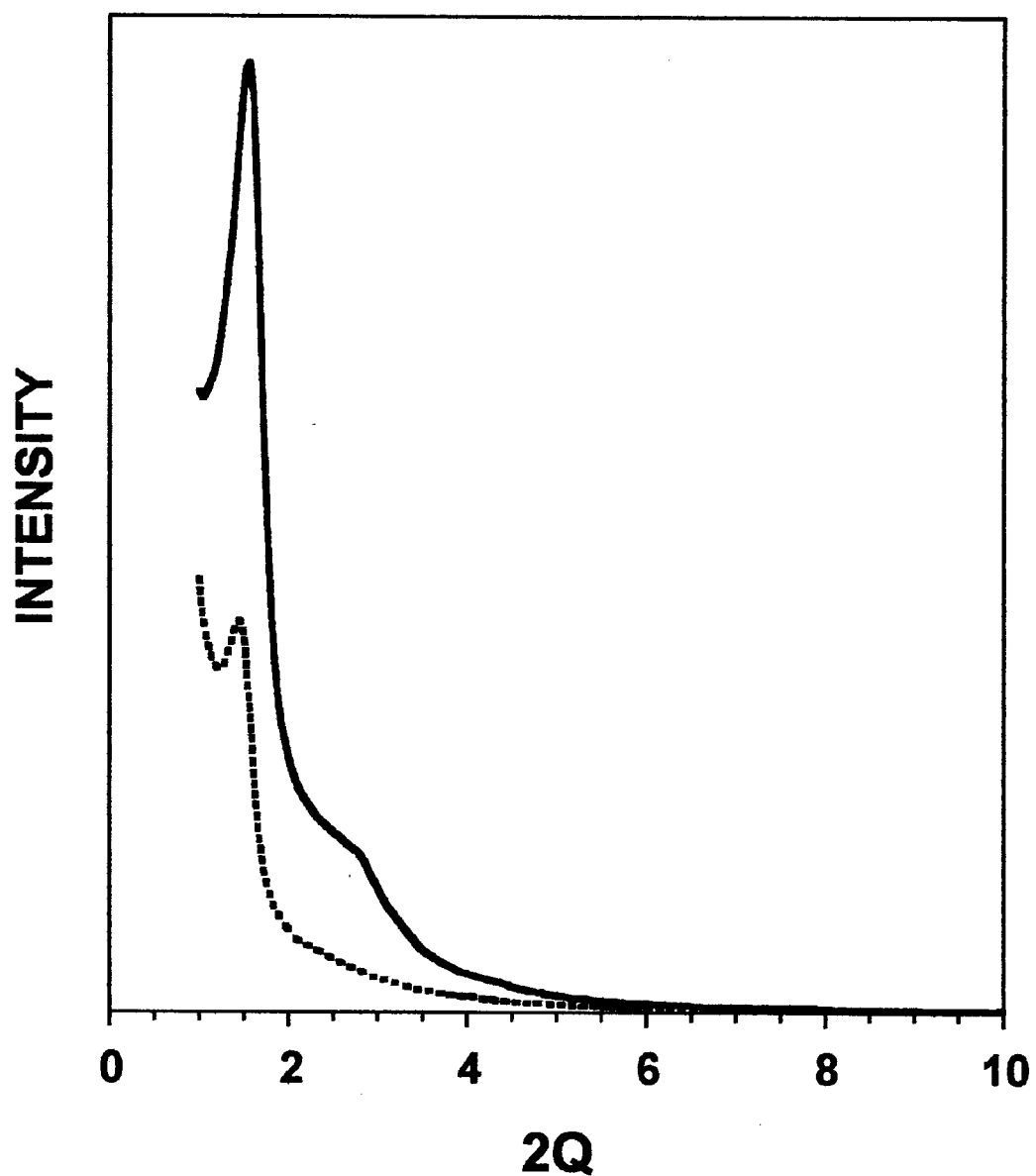
FIG. 4 is a graph of a X-ray powder diffraction pattern of the as synthesized (dotted line) and calcined (solid line) MSU-X' product of Example 2.
Figure 5:
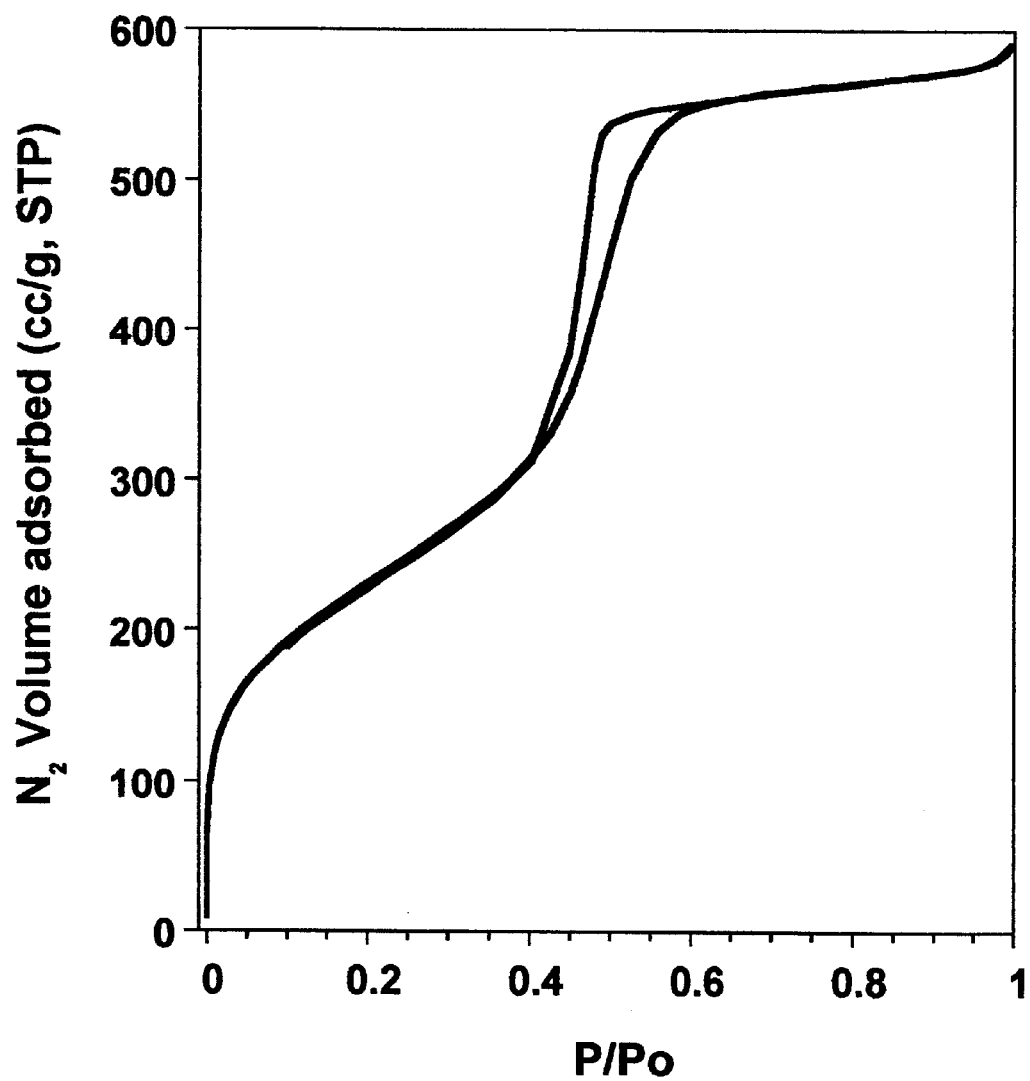
FIG. 5 is a graph of a Nitrogen adsorption-desorption isotherm of the calcined product of Example 17.
Figure 6:
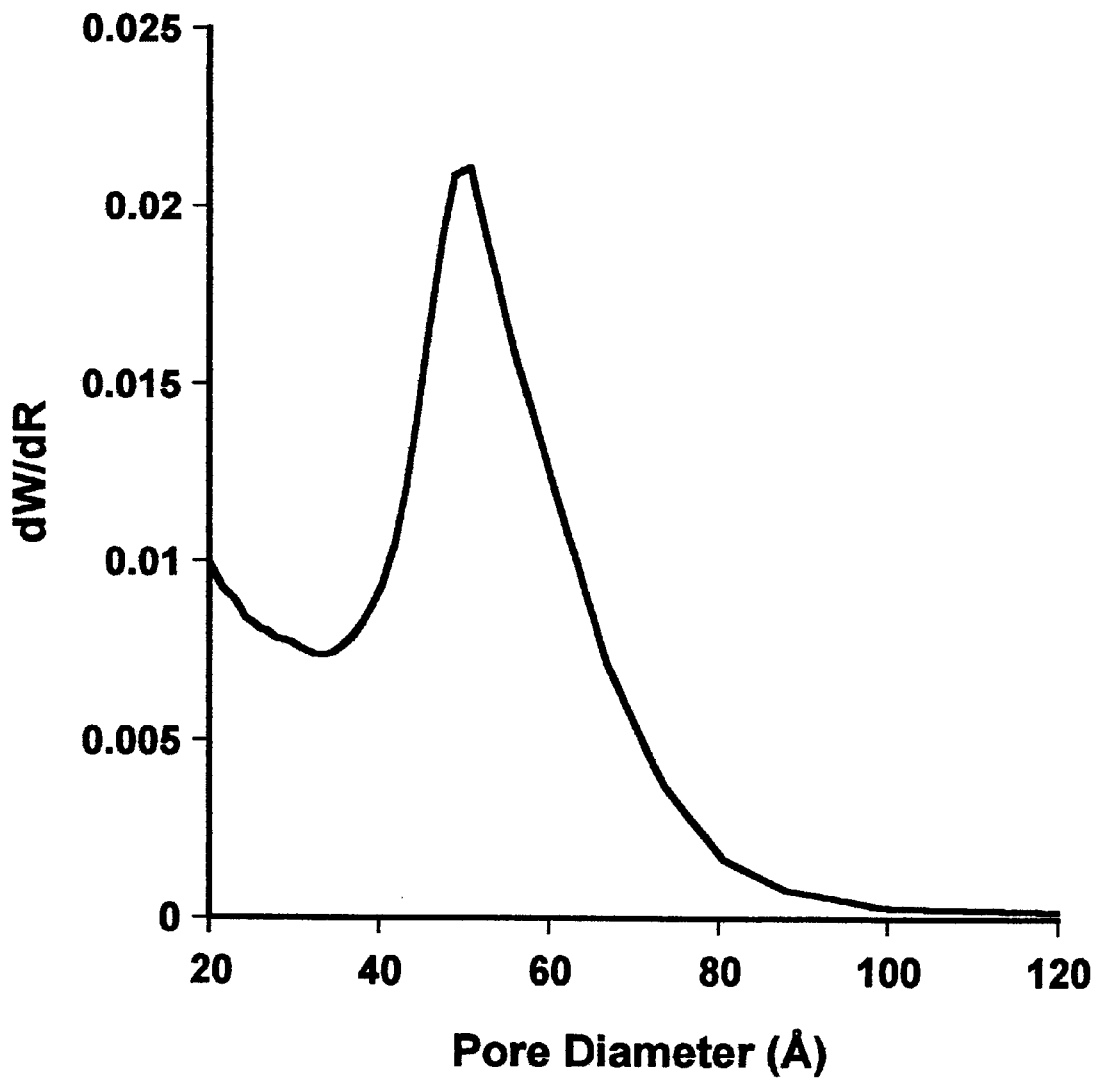
FIG. 6 is a graph of a Horvath-Kawazoe pore size distribution of the calcined product of Example 17.

The powder X-ray diffraction pattern of Example 17 (FIG. 4) is representative of Examples 16–21 and indicate a disordered wormhole pore structure as confirmed in the TEM image (FIG. 2). The $N_2$ adsorption-desorption isotherm (FIG. 5) and the corresponding Horvath and Kawazoe plot (FIG. 6) indicate uniform pore diameters and significant framework pore volumes for these silicas with little to no textural porosity.

EXAMPLES 20 AND 21

These Examples show compositions prepared by templating with the non-ionic surfactant Brij 56 at various assembly temperatures.

The acidic Brij 56 solution were prepared as in the preparation art of the previous Examples 16–19. An amount of sodium silicate solution was added in the appropriate amount so that the Si:surfactant molar ratio was 7:1. The resulting solution was stirred and aged for 20 hours at 25°, 45°, and 60° C. (Example 17), respectively. The remainder of the preparation was identical to the preparation art of Examples 16–19. The calcined products exhibited physico-chemical properties as described in Table 3.

TABLE 3

| Example | Assembly Temp. (° C.) | $d_{100}$ (Å) as-syn. | $d_{100}$ (Å) cal. | HK pore size (Å) | BET Surface area (m²/g) | Wall thickness (Å) | Pore Volume (cm³g⁻¹) |
|---|---|---|---|---|---|---|---|
| 20 | 25 | 63.1 | 50.6 | 32 | 602 | 25 | 0.36 |
| 21 | 45 | 61.3 | 52.6 | 37 | 769 | 16 | 0.57 |
| 17 | 60 | 63.1 | 58.1 | 50 | 849 | 8 | 0.90 |

EXAMPLES 22–26

The following examples were prepared to confirm the ability of Tergitol and sorbitan ester ethoxylate surfactants (TWEEN X) to act as templating agents for mesostructure formation in the manner of the present invention.

The acidic 1.2 grams of Tween X (X=20, 40, 60, and 80) solution was prepared as in the preparation art of the previous Examples 16–21. An amount of sodium silicate solution was added in the appropriate amount so that the Si:surfactant molar ratio was 13–14:1. The resulting solution was stirred and aged for 20 h at 60° C. The remainder of the synthesis was identical to Examples 16–21. The calcined templated products exhibited XRD patterns (FIG. 4), BET surface areas, HK pore size distributions and pore wall thicknesses as described in Table 5.

TABLE 4

| Example | Template formula | $d_{100}$ (Å) as-syn | $d_{100}$ (Å) cal | HK pore size (Å) | BET Surface area[a] (m²/g) | Wall thickness[b] (Å) | Pore Volume (cm³g⁻¹) |
|---|---|---|---|---|---|---|---|
| 22 | Tergital (15-S-15) | 59.7 | 53.2 | 40 | 979 | 13 | 0.86 |
| 23 | Tween 20 | 58.9 | 52.9 | 42 | 883 | 11 | 0.84 |
| 24 | Tween 40 | 65.9 | 58.9 | 49 | 753 | 10 | 0.80 |
| 25 | Tween 60 | 66.9 | 58.9 | 48 | 773 | 11 | 0.75 |
| 26 | Tween 80 | 71.2 | 65.0 | 51 | 867 | 14 | 0.89 |

EXAMPLE 27

Example 26 demonstrates the viability of recovering the template from the inorganic structure prior to calcination through solvent extraction.

A 0.05 grams quantity of the air-dried and non-calcined product of Example 25 is examined by thermogravimetric analysis (TGA) under $N_2$ gas flow at a heating rate of 5° C. min⁻. One gram of the same air-dried and non-calcined product of Example 25 is stirred in 100 milliliter volumes of hot ethanol (65° C.) for 1 hour. The product is then filtered and washed with a second and a third 100 milliliter volume of hot ethanol. The filtered product is then dried at room temperature for 20 hr. This product is then analyzed by TGA and $N_2$ adsorption-desorption isotherm.

EXAMPLES 28 TO 30

The following examples were prepared to confirm the ability of Brij 76 to act as templating agents for hexagonal mesostructure formation in the manner of the present invention.

The acidic 1.2 grams of Brij 76 solution was prepared as in Examples 1 through 6. An amount of sodium silicate solution was added in the appropriate amount so that the Si:surfactant molar ratio was 7:1. The resulting solution was stirred and aged for 20 h at 25°, 45°, and 60° C., respectively. The remainder of the synthesis was identical to the preparation art described in Examples 16–21. The calcined templated products exhibited XRD patterns, BET surface areas, HK pore size distributions and pore wall thicknesses as described in Table 5.

TABLE 5

| Example | Assembly Temp. (° C.) | $d_{100}$ (Å) as-syn | $d_{100}$ (Å) cal. | HK pore size (Å) | BET Surface area (m²/g) | Wall thickness [a](Å) | Pore Volume (cm³g⁻¹) |
|---|---|---|---|---|---|---|---|
| 28 | 25 | 69. | 53.9 | 32 | 453 | 30 | 0.36 |
| 29 | 45 | 69.0 | 58.1 | 43 | 709 | 24 | 0.57 |
| 30 | 60 | 69.0 | 65.0 | 52 | 745 | 23 | 0.90 |

[a]Calculated by $a_o$ - pore size ($a_o = 2d(100)/\sqrt{3}$)

Figure 7:
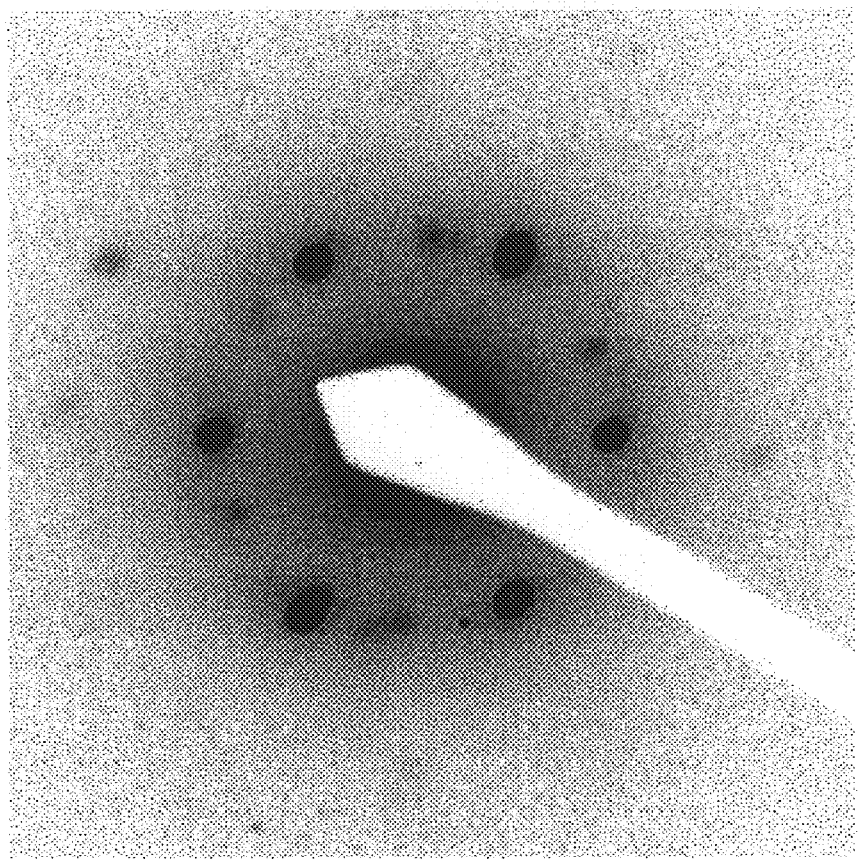
FIG. 7 is the selected area electron diffraction pattern (SAED) of the calcined product of Example 28.
Figure 8:
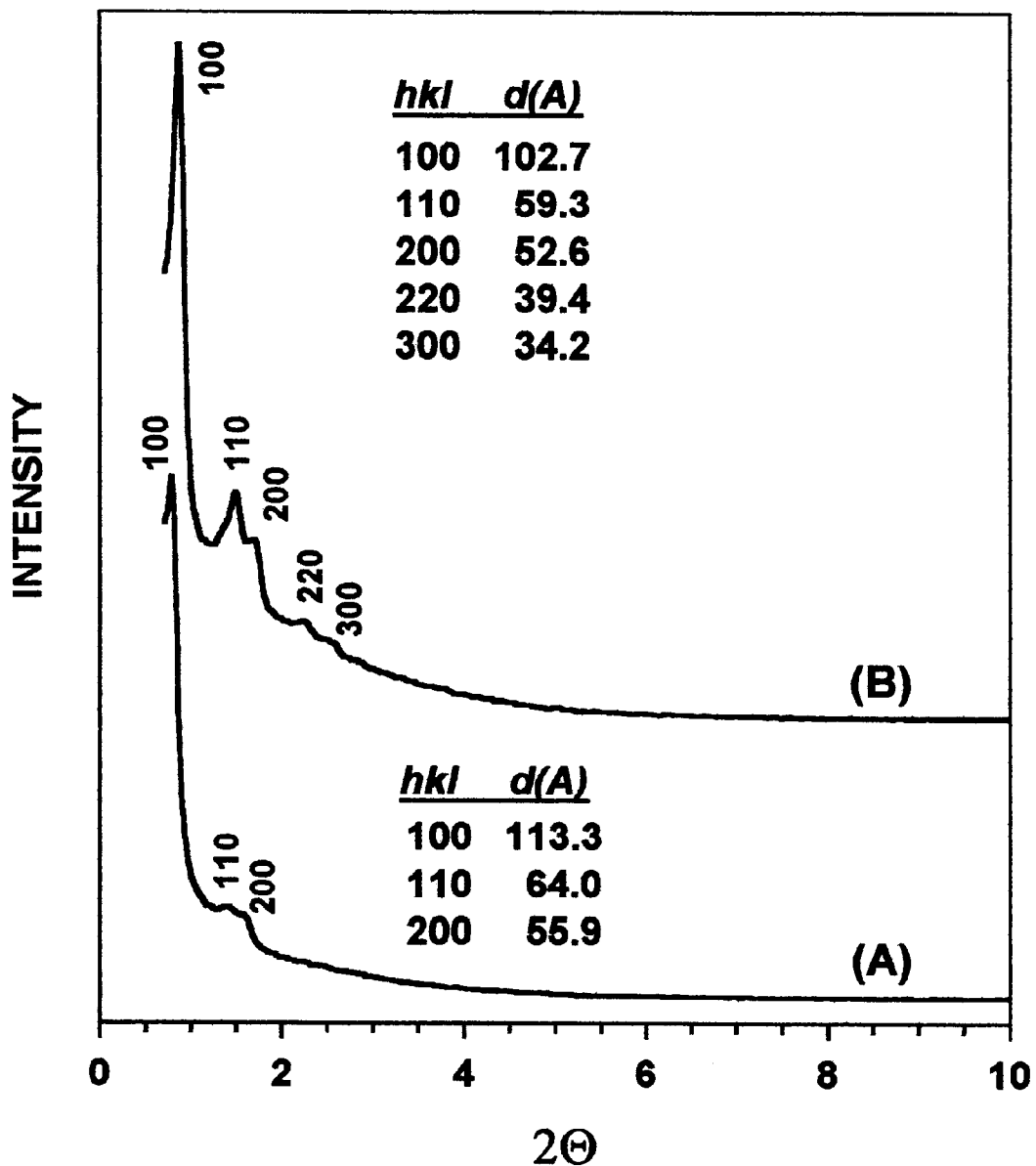
FIG. 8 is a graph of a X-ray powder diffraction pattern of the (A) as-synthesized and (B) calcined product of Example 31.

The selected area electron diffraction pattern (FIG. 7) of Example 28 shows the six fold symmetry of the hexagonal array. X-ray diffraction patterns of samples 28–30 are similar to that of Example 31 shown in FIG. 8.

EXAMPLE 31

The following example was prepared for mesostructure formation with ordered and large pore size by PLURONIC P123 to act as templating agents in the manner of the present invention.

The acidic 1.2 grams of PLURONIC P123 solution was prepared as in Examples 16–21. An amount of sodium silicate solution was added in the appropriate amount so that the Si:surfactant molar ratio was 60:1. The resulting solution was stirred and aged for 20 h at 60° C. The remainder of the synthesis was identical to the preparation art described in Examples 16–21. The calcined templated products exhibited XRD patterns (FIG. 8), and BET surface areas, BJH pore size distributions and pore wall thickness as described in Table 6.

TABLE 6

| Example | Template formula | $d_{100}$ (Å) as-syn. | $d_{100}$ (Å) Calcine | BJH pore size (Å) | BET Surface area[a] (m²/g) | Wall thickness [b](Å) | Pore Volume (cm³g⁻¹) |
|---|---|---|---|---|---|---|---|
| 31 | Pluronic P123 | 113.3 | 102.7 | 98 | 625 | 21 | 1.24 |

[a]The framework-confined mesoporous size was determined by BJH of the $N_2$ adsorption isotherm.
[b]Calculated by $a_o$ - pore size ($a_o = 2d(100)/\sqrt{3}$)

Figures 9, 9A:
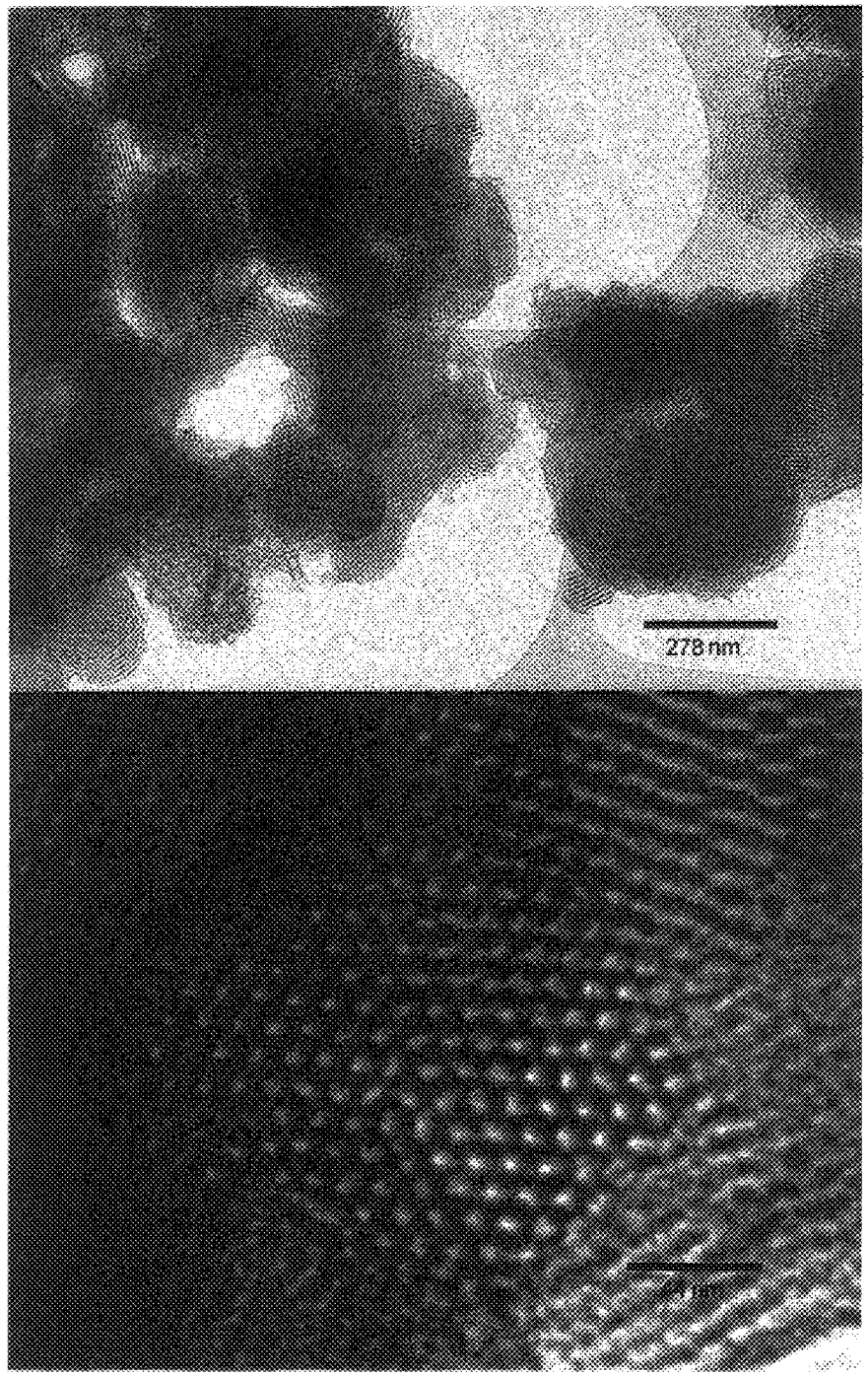
FIGS. 9 and 9A are TEM images of the calcined product of Example 31.
Figure 10:
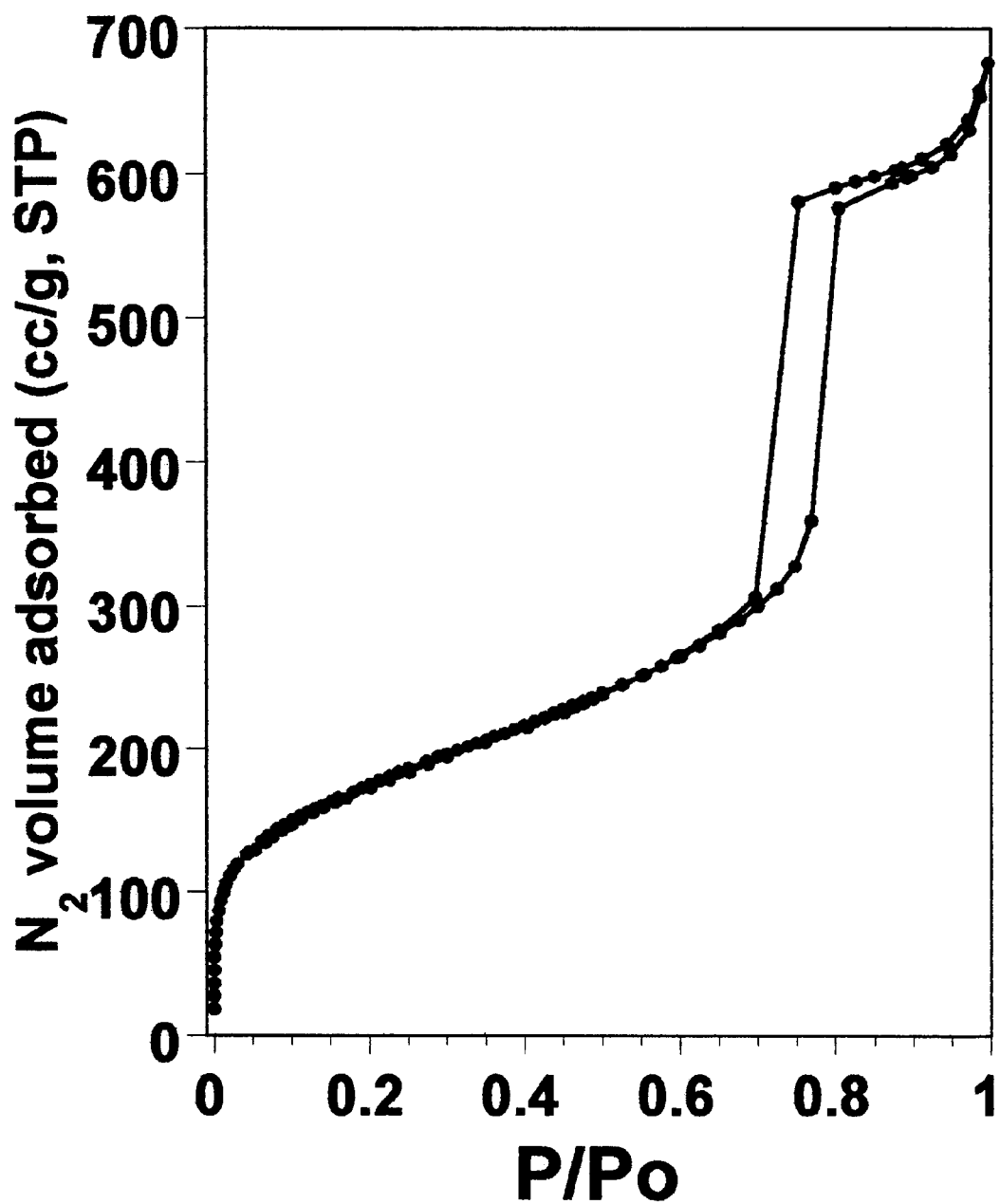
FIG. 10 is a graph showing a nitrogen adsorption-desorption isotherm of the calcined product of Example 31.
Figure 10A:
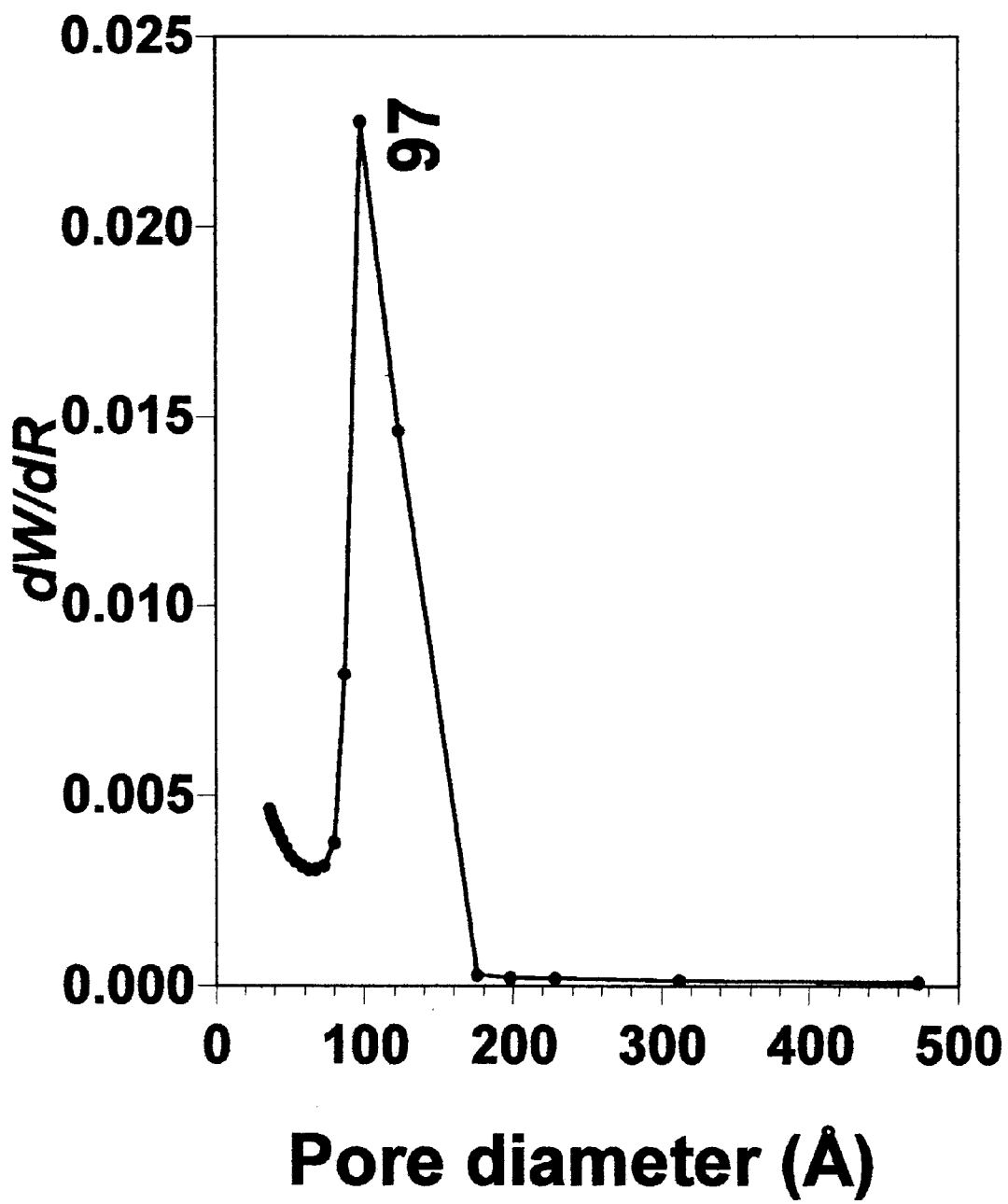
FIG. 10A is a graph showing the BJH pore size distribution from adsorption branch of $N_2$ isotherm.

TEM images (FIG. 9) show small domains of hexagonally ordered channels of ~10 nm in diameter within small particle (200–400 nm) silicas. $N_2$ adsorption and corresponding BJH pore size model (FIGS. 10 and 10A) confirm the pore size, surface area and pore volumes.

It is intended that the foregoing description be only illustrative of the present invention and that the present invention be limited only by the hereinafter appended claims.

We claim:

1. A process for the preparation of a molecular sieve silica which comprises:
   (a) providing an aqueous solution of a water soluble silicate at a pH>9;
   (b) combining the aqueous solution with a non-ionic polyoxyethylene oxide based surfactant and an acid in aqueous solution to produce a resulting mixture wherein the acid causes the pH of the mixture to be between about 4 and 10;
   (c) aging the resulting mixture at a temperature between 0 and 150° C. until the molecular sieve silica is formed; and
   (d) removing at least the aqueous solution to produce the molecular sieve silica.

2. A process for the preparation of a molecular sieve aluminosilicate which comprises:
   (a) providing an aqueous solution of a water soluble aluminate and silicate in a molar ratio of aluminate to silicate of between about 0.01 and 1.0 at a pH>9;
   (b) combining the aqueous solution with a non-ionic polyoxyethylene oxide based surfactant and an acid in aqueous solution to produce a resulting mixture wherein the acid causes the pH of the mixture to be between about 4 and 10;
   (c) aging the resulting mixture at a temperature between 0 and 150° C. until the molecular sieve aluminosilicate is formed; and
   (d) removing at least the aqueous solution to produce the molecular sieve aluminosilicate.

3. A process for the preparation of a molecular sieve aluminosilicate which comprises:
   (a) providing an aqueous solution of a water soluble silicate at a pH>9;
   (b) combining the aqueous solution with a non-ionic polyoxyethylene oxide surfactant, an aluminum salt and an acid in aqueous solution to produce a resulting mixture wherein the aluminum to silicon molar ratio is between 0.01 and 1.0 and the acid and the aluminum salt causes the pH of the mixture to be between about 4 and 10;
   (c) aging the resulting mixture at a temperature between 0 and 150° C. until the molecular sieve silica is formed; and
   (d) removing at least the aqueous solution to produce the molecular sieve aluminosilicate.

4. The process of claims 1, 2 or 3 wherein in step (d) the water is removed from the silica so that it is dry.

5. The process of claims 1, 2 or 3 wherein the surfactant in the molecular sieve product produced in step (d) is removed by extraction with a solvent, by calcination, or a combination of extraction and calcination.

6. The process of claim 2 wherein the aluminate is an alkali metal aluminate.

7. A process for the preparation of a mesostructured silicate which comprises:

(a) acidifying a solution of a non-ionic polyethylene oxide based surfactant as an organic structure director with an acid selected from the group consisting of an organic acid, a mineral and an oxy acid;

(b) preparation of a reactive silica species by neutralization of a soluble silicate solution through addition to the acidified surfactant reaching a final pH of 4 to 10;

(c) aging the reactive organic-inorganic species for no less than 5 minutes at temperatures between 0 and 150° C., optionally adding a precursor for the incorporation of an element in addition to silicon into the silicate framework, and continuing the aging process to complete the crosslinking of the framework;

(d) recovering of the silicate by filtration or other suitable solvent removal procedure; and (e) optionally removing the surfactant from the silicate by solvent extraction or by calcination at least 400° C. in air for not less than 30 minutes or by a combination of solvent extraction and calcination, wherein the resulting silicate possesses uniform framework-confined mesopores with pore diameters ranging from 1.5 to 30.0 nm;

the composition exhibits at least one resolved powder X-ray reflection corresponding to a pore-pore correlation spacing of 2.0–35.0 nm, silicate wall thickness of greater than 0.5 nm, specific surface areas of 300–1400m$^2$/g, framework pore volumes of 0.2–3.0 cc/g N$_2$, and textural pore volumes of 0.0–2.0 cc/g N$_2$.

8. The process of claim 7 wherein the soluble silicate solution in step (b) is a sodium silicate 'water glass' with SiO$_2$/Na$_2$O—1.5–4.0.

9. The process of claim 7 wherein the soluble silicate solution in step (b) is colloidal silica or fumed silica.

10. The process of claim 9 wherein the silicate solution is prepared with addition of an alkali metal or organic base.

11. The process of claim 7 wherein said acid is selected from the group consisting of:

HX, where X is Cl, Br, or I;

H$_n$Y, where Y is NO$_3^-$, SO$_4^{-2}$, SO$_3^{-2}$, PO$_4^{-3}$, or CO$_3^{-2}$, where n is equal to the charge on Y; and HZ, where Z is acetate, glycolate or formate.

12. The process of claim 7 wherein the silicate phase has a composition expressed in anhydrous form as follows:

$$M_{n/q}(B_pSi_{1-p}O_h)$$

wherein M is one or more ions;

n is the charge of the composition excluding M expressed as oxides;

q is the molar average valence of M;

n/q is the number of moles or mole fraction of M where n/q=0 to 0.5;

h is a number of from 2 to 2.50, B is one or more atoms selected from the group consisting of Ar, B, Ge, Sb, Zr, V, W, P, Ba, Y, La, Ce, Sn, Ti, Cr, Nb, Fe, V, Ga, Al, Zn, Zr, Co, Ni, Mo and Cu, and p=0.0 to 0.5.

13. The process of claim 12 wherein the silicate has at least one resolved x-ray reflection and a x-ray diffraction pattern selected from the group consisting of FIGS. 1, 4 and 8.

14. The process of claim 12 wherein the silicate has a N$_2$ adsorption-desorption isotherm selected from the group consisting of FIGS. 3, 5 and 10.

15. The process of claim 12 wherein the silicate has a BET surface area between 300 and 1400 m$^2$/g.

16. The process of claim 12 wherein the silicate has a framework confined mesopore volume from 0.2–3.0 cc/g.

17. The process of claim 12 having an extra-particle, or textural mesopore volume from 0.0–2.0 cc/g.

18. The process of claim 12 wherein the silicate has TEM micrograph selected from the group consisting of FIGS. 2 and 9.

19. The process of claim 12 wherein the silicate has curved tubular, or 'wormhole' channel structures.

20. The process of claim 12 wherein the silicate has 1-dimensional, hexagonally ordered channel structures.

21. The process of claim 7 wherein the product has a composition expressed as follows:

$$r(EO)M_{n/q}(B_pSi_{1-p}O_h)$$

wherein EO is the total organic material not included in M;

EO is selected from the group of non-ionic alkyl polyethylene oxide, alkyl and aryl polyethylene oxide and polyethylene oxide-polypropylene oxide-polyethylene oxide block co-polymer molecules; and r is the moles of EO; wherein M is one or more ions;

n is the charge of the composition excluding M expressed as oxides;

q is the molar average valence of M;

n/q is the number of moles or mole fraction of M where n/q=0 to 0.5;

h is a number of from 2 to 2.50, B is one or more atoms selected from the group consisting of Ar, B, Ge, Sb, Zr, V, W, P, Ba, Y, La, Ce, Sn, Ti, Cr, Nb, Fe, V, Ga, Al, Zn, Zr, Co, Ni, Mo and Cu, and p=0.0 to 0.5.

22. A process for the preparation of a mesostructured silicate composition which comprises the steps of:

(a) preparing a solution of a water soluble silicate at a pH greater than about 9.0;

(b) preparing a solution of a polyoxyethylene oxide based surfactant and acid at a pH less than 4;

(c) combining solutions of steps (a) and (b) to form a reactive mixture at a pH between 4 and 10 and at a temperatures between 0 and 150° C.;

(d) aging the mixture at temperatures between 0 and 150° C. for a period of at least 5 minutes to form a silicate-surfactant mesostructure;

(e) washing the silicate-surfactant mesostructure with water;

(f) recovering the washed mesostructure by filtration, centrifugation, or a combination of filtration and centrifugation;

(g) drying the recovered mesostructure at or above ambient temperature; and (h) removing the surfactant from the dried mesostructure by solvent extraction, by calcination at a temperature above about 400° C. or by a combination of solvent extraction and calcination.

23. The process of claim 22 wherein the water-soluble silicate is selected from the group comprising an alkali metal silicate and a quaternary ammonium ion silicate.

24. The process of claim 22 in which the acid is selected from the group comprising an organic carboxylic acid, a mineral acid, and an inorganic oxyacid.

25. The process of claim 22 in which the mixture formed in step (c) is titrated with an acid or a base to achieve a pH between about 4 and 10.

26. The process of claim 22 in which up to 50% of the silicon atoms in the silicate framework are replaced by a heteroatom through the addition of a heteroatom precursor in step (a) or step (b).

27. The process of claim 22 in which an organic moiety is incorporated into the mesostructured silicate framework through the addition of a LSi(OR')$_3$ precursor to steps (a) or (b), or (c) where L is the organic moiety linked to silicon precursor through a silicon-carbon bond, and OR' is a hydrolyzable group attached to the silicon center of the precursor.

28. A process for the preparation of a mesostructured aluminosilicate which comprises:

(a) acidifying a solution of a non-ionic polyethylene oxide based surfactant as the organic structure director with an acid selected from the group consisting of an organic acid, a mineral acid and an oxy acid;

(b) preparation of a reactive silica and aluminum species by neutralization of a soluble silicate and aluminate solution through addition to the acidified surfactant reaching a final pH of 4 to 10;

(c) aging the solution of step (b) for no less than 5 minutes at temperatures between 0 and 150° C. to produce an aluminosilicate;

(d) recovering the aluminosilicate by filtration or other suitable solvent removal procedure; and (e) removing the surfactant from the aluminosilicate by solvent extraction or by calcination at least 400° C. in air for not less than 30 minutes or by a combination of solvent extraction and calcination, wherein the aluminosilicate possesses uniform framework-confined mesopores with pore diameters ranging from 1.5 to 30.0 nm;

the composition exhibits at least one resolved powder X-ray reflection corresponding to a pore-pore correlation spacing of 2.0–35.0 nm, inorganic oxide wall thickness of greater than 0.5 nm, specific surface areas of 300–1400m$^2$/g, framework pore volumes of 0.2–3.0 cc/g N$_2$, and textural pore volumes of 0.0–2.0 cc/g N$_2$.

* * * * *

UNITED STATES PATENT AND TRADEMARK OFFICE
CERTIFICATE OF CORRECTION

PATENT NO. : 6,607,705 B2  Page 1 of 1
DATED : August 19, 2003
INVENTOR(S) : Thomas J. Pinnavaia, Thomas R. Pauly and Seong-Su Kim It is certified that error appears in the above-identified patent and that said Letters Patent is hereby corrected as shown below:

Column 4,
Line 49, "silicor" should be -- silicon --.
Line 59, "4000°C" should be -- 400°C --.

Column 6,
Line 47, "poren-pore" should be -- pore-pore --.

Column 11,
Line 33, "Table 5" should be -- Table 4 --.
Line 52, "Example 26" should be -- Example 27 --.
Line 60, "min" should be -- $min^{-1}$ --.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,607,705 B2 | Page 1 of 1 |
| APPLICATION NO. | : 09/834319 | |
| DATED | : August 19, 2003 | |
| INVENTOR(S) | : Thomas J. Pinnavaia et al. | |

It is certified that error appears in the above-identified patent and that said Letters Patent is hereby corrected as shown below:

In the Specification:

In column 1, lines 12-14, please delete:

"This invention was sponsored by NSF grants CHE 96-33798 and 99-03706. The government has certain rights in this invention."

and insert:

-- This invention was made with government support under 9633798 and 9903706 awarded by the National Science Foundation. The government has certain rights in the invention. --

Signed and Sealed this
Fourth Day of November, 2014

Michelle K. Lee
*Deputy Director of the United States Patent and Trademark Office*